United States Patent
Yang et al.

(10) Patent No.: US 10,863,866 B2
(45) Date of Patent: Dec. 15, 2020

(54) DETACHABLE JUICER

(71) Applicant: SHENZHEN NINGRUI ELECTRONIC TECHNOLOGY CO., LTD., Shenzhen (CN)

(72) Inventors: Hong-Sheng Yang, Shenzhen (CN); Shi-Hai Zou, Shenzhen (CN)

(73) Assignee: SHENZHEN NINGRUI ELECTRONIC TECHNOLOGY CO., LTD., Shenzhen (CN)

( * ) Notice: Subject to any disclaimer, the term of this patent is extended or adjusted under 35 U.S.C. 154(b) by 202 days.

(21) Appl. No.: 16/119,235

(22) Filed: Aug. 31, 2018

(65) Prior Publication Data
US 2019/0380536 A1 Dec. 19, 2019

(30) Foreign Application Priority Data

Jun. 13, 2018 (CN) .......................... 2018 1 0606004

(51) Int. Cl.
 *A47J 43/046* (2006.01)
 *B02C 18/12* (2006.01)
 *B02C 18/24* (2006.01)

(52) U.S. Cl.
 CPC ............. *A47J 43/046* (2013.01); *B02C 18/12* (2013.01); *B02C 18/24* (2013.01)

(58) Field of Classification Search
 CPC .. A47J 43/046; A47J 43/0716; A47J 43/0722; A47J 43/085; B02C 18/12; B65D 2313/04
 See application file for complete search history.

(56) References Cited

U.S. PATENT DOCUMENTS

| | | | | |
|---|---|---|---|---|
| 6,629,492 | B1* | 10/2003 | Li ................... | A47J 43/046 241/37.5 |
| 2016/0000266 | A1* | 1/2016 | Potter .............. | A47J 43/0716 241/199.12 |
| 2016/0120367 | A1* | 5/2016 | Braun ............... | A47J 43/046 366/314 |
| 2017/0086621 | A1* | 3/2017 | Bascom ............. | A47J 43/0716 |
| 2017/0354940 | A1* | 12/2017 | Kolar ................ | B01F 15/00435 |
| 2018/0008097 | A1* | 1/2018 | Mehlman ........... | B01F 7/1695 |

(Continued)

FOREIGN PATENT DOCUMENTS

CN 107319963 * 11/2017 ............ A47J 43/046

OTHER PUBLICATIONS

Jun, Translation of CN 107319963 (Year: 2017).*

*Primary Examiner* — Adam J Eiseman
*Assistant Examiner* — Bobby Yeonjin Kim

(57) ABSTRACT

A detachable juicer comprises a base having a driving device and a circuit board mounted therein and a cup. An inductive switch mounted on the upper end surface of the base and a power line is connected with the circuit board. A driving device is connected with a lower connector. A lower magnet is embedded in the upper end surface of the base, and an anti-lip suction cup covers the lower magnet. The cup is provided with a cup cover having a lower end surface embedded with an upper magnet. A tapered portion in the cup cover is provided with a central through hole and is mounted with a paddle cutter having a shaft passing through the central through hole. The bottom of the upper connector and the top of the lower connector are provided with engaging teeth or blocks for engaging with each other.

7 Claims, 2 Drawing Sheets

(56) References Cited

U.S. PATENT DOCUMENTS

| | | | | |
|---|---|---|---|---|
| 2018/0117552 A1* | 5/2018 | Kozlowski | ........ | B01F 15/00538 |
| 2018/0140137 A1* | 5/2018 | Barnard | ................ | A47J 43/042 |
| 2019/0000275 A1* | 1/2019 | Sapire | ................. | A47J 43/0772 |
| 2019/0117013 A1* | 4/2019 | Kim | ........................ | A47J 36/24 |
| 2019/0142221 A1* | 5/2019 | Miller | ................ | A47J 43/0716 |
| | | | | 366/205 |
| 2020/0046171 A1* | 2/2020 | Sirju | ................... | A47J 43/0722 |

* cited by examiner

DETACHABLE JUICER

CROSS REFERENCE TO RELATED APPLICATION

This application claims the priority benefit of Chinese Patent Application Serial Number 201810606004.2, filed on Jun. 13, 2018, the full disclosure of which is incorporated herein by reference.

BACKGROUND

Technical Field

The present disclosure generally relates to a juice extracting device, and more particularly to a detachable juicer

Related Art

The juicer, also known as the juice cup, is a machine that can quickly squeeze fruits and vegetables into juices. The juicer is small and can be used in household. The rotary blade of the existing juicer is mounted on the upper end of the base and is mounted on the side of the base. When the cup is not mounted, the blade is exposed. When the switch is pressed accidentally, damage is easily caused. Moreover, since the blade is connected to the base, it is not easy to clean. When the cup is installed, since the cup and the base are connected by a snap or a thread, it is necessary to perform alignment, screwing, clamping, etc. when installing the cup, so as to ensure safety; however, the use is inconvenient.

SUMMARY

The present disclosure provides a detachable juicer to solve the above disadvantages.

The above object of the present disclosure is achieved by the following technical solution: a detachable juicer comprising a base and a cup.

A bottom case is disposed on the bottom of the base. A driving device and a circuit board are mounted in the base. The driving device is connected to the circuit board. The circuit board is connected with an inductive switch and a power line, and the inductive switch is mounted on the upper end surface of the base. A hole is provided in the center of the base. The driving device is connected with a lower connector, and the lower connector is located in the hole. A lower magnet is embedded in the upper end surface of the base, and an anti-slip suction cup is disposed. The anti-slip suction cup covers the lower magnet.

The cup is provided with a cup cover, and the cup cover and the opening of the cup are connected by threads. The lower end surface of the cup cover is embedded with an upper magnet corresponding to the lower magnet. The middle part of the cup cover is provided with a tapered portion. The tapered portion is provided with a central through hole and is mounted with a paddle cutter. The shaft of the paddle cutter passes through the central through hole of the tapered portion, and the upper connector is connected to the bottom.

The bottom of the upper connector and the top of the lower connector are provided with engaging teeth or blocks.

In another embodiment, the driving device is a brushless motor vertically mounted, and the motor shaft is connected to the lower connector.

In another embodiment, the driving device is a brush motor horizontally mounted, the motor shaft is connected to the worm, and a worm wheel meshing with the worm is mounted on one side of the worm, and the wheel shaft of the worm wheel is connected with the lower connector.

In another embodiment, the paddle cutter is provided with an upper V-shaped upper blade and an inverted V-shaped lower blade.

In another embodiment, the edge of the base is provided with an LED indicator, and the LED indicator is connected to the circuit board.

In another embodiment, the cup cover is provided with a sealing ring.

In another embodiment, the cup is made of plastic or glass.

The working principle of the disclosure is as follows. The food material is put into the cup. Then the cup cover is screwed tightly, and then placed on the base. The induction switch is then pressed to start the circuit. The driving device rotates to drive the paddle cutter to rotate, thereby realizing the function of extracting the juice. During the operation of the machine, the cup is stabilized by the adsorption force of the upper and lower magnets, and the LED indicators are illuminated in sequence to display the progress in real time.

The disclosure has the following advantages compared with the prior art. The disclosure changes the structure of the juice cup of the prior art. The operation for the juice cup structure of the disclosure is simple, safe, easy to clean, quiet and environmentally friendly, and the juice cup structure of the disclosure has a long service life.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
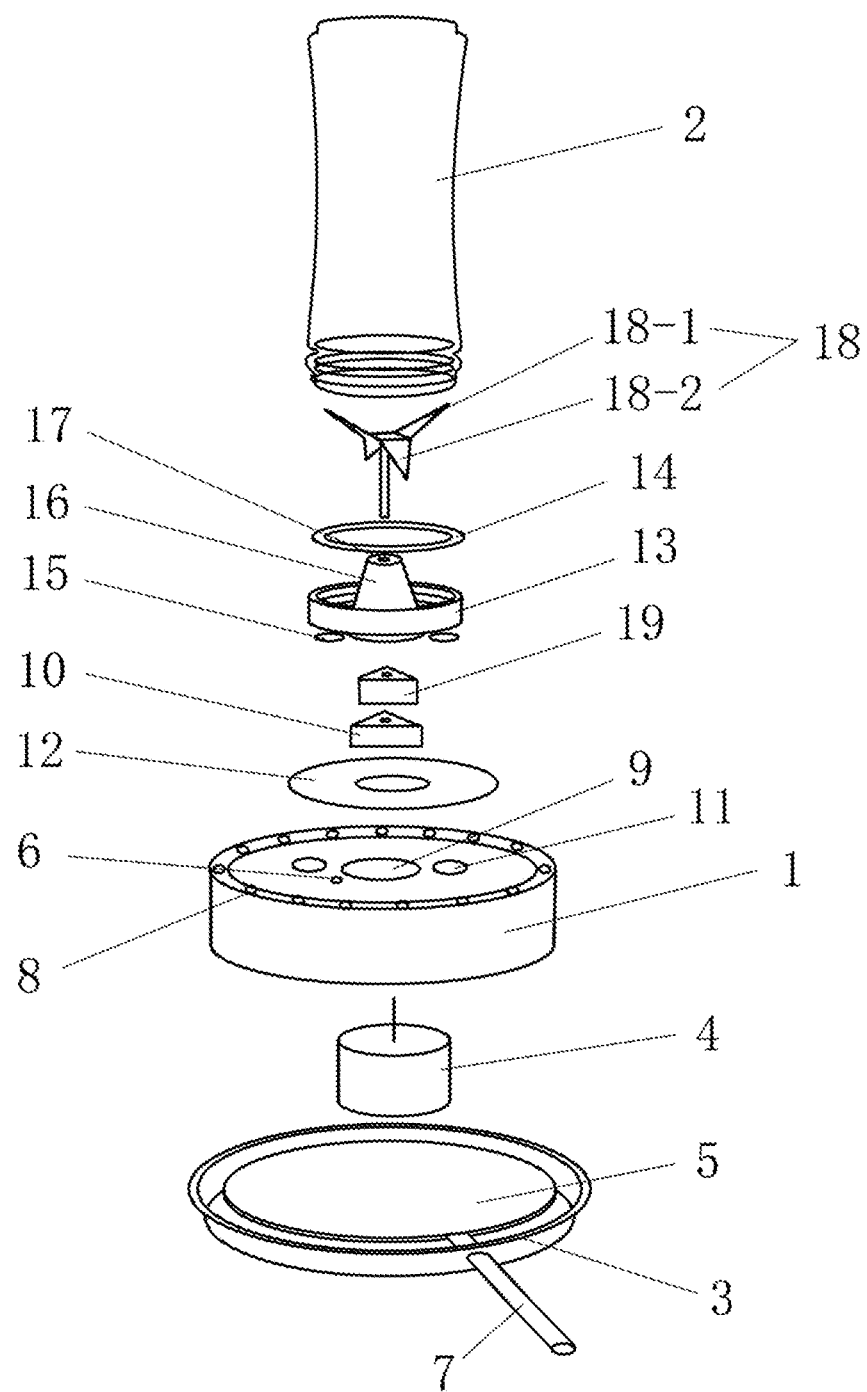
FIG. 1 is a schematic structural view of the first embodiment of the present disclosure.

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

In the following embodiment, the same reference numerals is used to refer to the same or similar elements throughout the disclosure.

First Embodiment

As shown in FIG. 1, a detachable juicer comprises a base 1 and a cup 2. The cup 2 is made of plastic or glass. The bottom of the base 1 is provided with a bottom case 3. The driving device 4 and the circuit board 5 are mounted inside the base. The driving device 4 is connected to the circuit board 5. The circuit board 4 is connected with an inductive switch 6 and a power line 7. The inductive switch 6 is mounted on the upper end surface of the base 1, and the edge of the base 1 is provided with a plurality of LED indicators 8. The LED indicators 8 are connected to the circuit board 5. The middle of the base 1 is provided with a hole 9. The driving device 4 is connected with a lower connector 10, and the lower connector 10 is located in the hole 9. The driving device 4 is a brushless motor vertically mounted, and the motor shaft is connected to the lower connector 10. A lower magnet 11 is embedded in the upper end surface of the base 1, and a anti-slip suction cup 12 is disposed. The anti-slip suction cup 12 covers the lower magnet 11. The cup 2 is provided with a cup cover 13, and the cup cover 13 is provided with a sealing ring 14. The cup cover 13 is screwed to the opening of the cup 2. The lower end surface of the cup cover 13 is embedded with an upper magnet 15 corresponding to the lower magnet 11. The inside of the cup cover 13 is provided with a tapered portion 16. The tapered portion 16 is provided with a central through hole 17 and is mounted with a paddle cutter 18 provided with an upper V-shaped upper blade 18-1 and an inverted V-shaped lower blade 18-2. The shaft of the paddle cutter 18 passes through the central through hole 17 of the tapered portion 16, and the upper connector 19 is connected to the bottom. The bottom of the upper connector 19 and the top of the lower connector 10 are provided with engaging teeth or blocks for engaging with each other.

The working principle of the disclosure is as follows. The food material is put into the cup 2 and the cup cover 13 is screwed tightly, then placed on the base 1. The induction switch 6 is pressed to start the circuit. The motor shaft of the brushless motor drives vertically mounted rotates the lower connector 10 and the upper connector 19 to drive the paddle cutter 18 to rotate, thereby realizing the function of extracting juice. During the operation of the machine, the cup 2 and the base 1 are tightly combined by the upper and lower magnets, and the LED indicators are illuminated in sequence to display the progress of the work in real time.

First Embodiment

Figure 2:
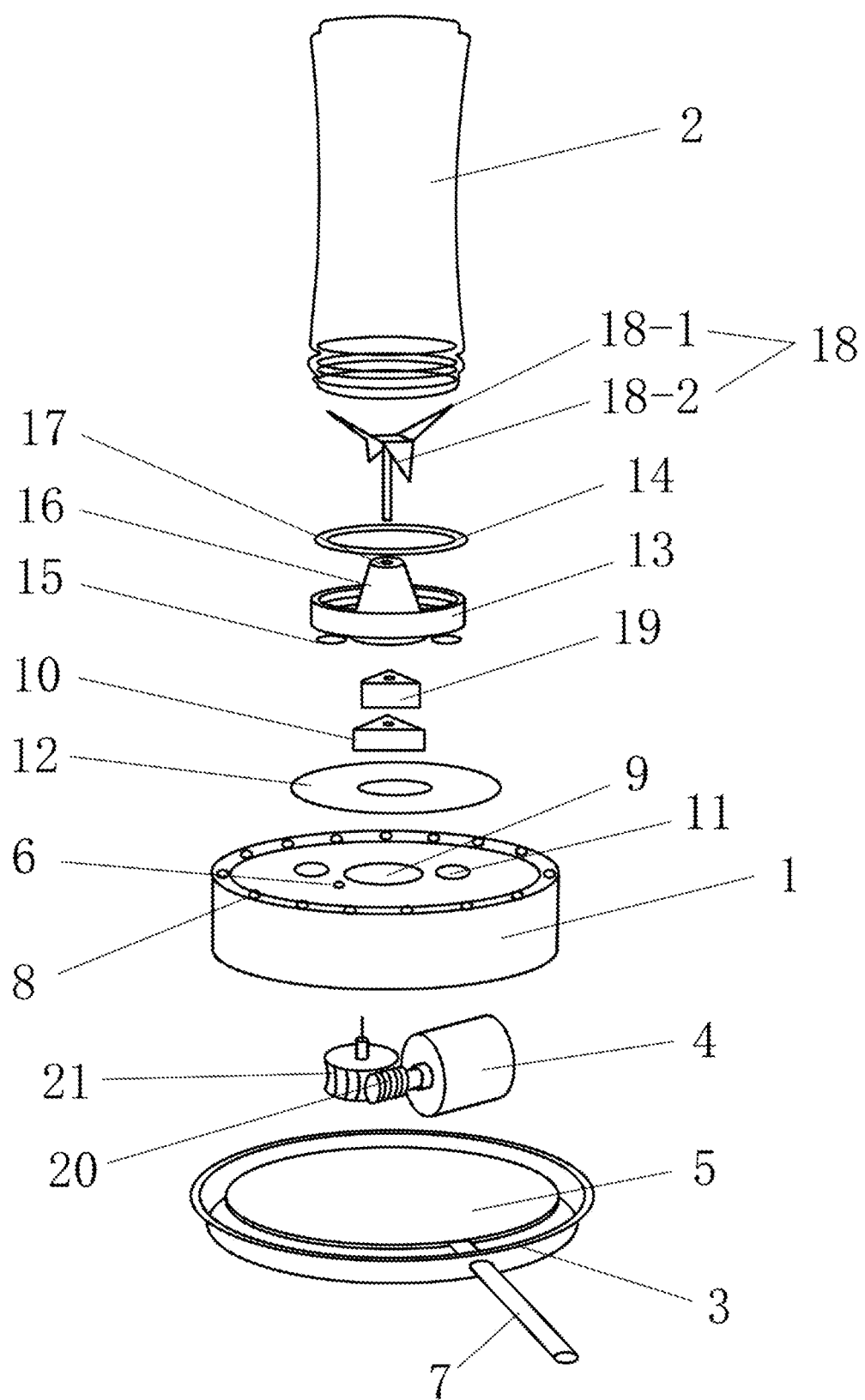
FIG. 2 a schematic structural view of the second embodiment of the present disclosure.

As shown in FIG. 2, a detachable juicer comprises a base 1 and a cup 2. The cup 2 is made of plastic or glass. The bottom of the base 1 is provided with a bottom case 3. The driving device 4 and the circuit board 5 are mounted inside the base. The driving device 4 is connected to the circuit board 5. The circuit board 4 is connected with an inductive switch 6 and a power line 7. The inductive switch 6 is mounted on the upper end surface of the base 1, and the edge of the base 1 is provided with a plurality of LED indicators 8. The LED indicators 8 are connected to the circuit board 5. The middle of the base 1 is provided with a hole 9. The driving device 4 is connected with a lower connector 10, and the lower connector 10 is located in the hole 9. The driving device 4 is a brush motor horizontally mounted. The motor shaft is connected to the worm 20, and a won't wheel 21 meshing with the worm 20 is mounted on one side of the worm 20. The wheel shaft of the worm wheel 21 is connected to the lower connector 10. A lower magnet 11 is embedded in the upper end surface of the base 1. An anti-slip suction cup 12 is disposed. The anti-slip suction cup 12 covers the lower magnet 11. The cup 2 is provided with a cup cover 13, and the cup cover 13 is provided with a sealing ring 14. The cup cover 13 is screwed to the opening of the cup 2. The lower end surface of the cup cover 13 is embedded with an upper magnet 15 corresponding to the lower magnet 11. The inside of the cup cover 13 is provided with a tapered portion 16. The tapered portion 16 is provided with a central through hole 17 and is mounted with a paddle cutter 18 provided with an upper V-shaped upper blade 18-1 and an inverted V-shaped lower blade 18-2. The shaft of the paddle cutter 18 passes through the central through hole 17 of the tapered portion 16, and the upper connector 19 is connected to the bottom. The bottom of the upper connector 19 and the top of the lower connector 10 are provided with engaging teeth or blocks for engaging with each other.

The working principle of the disclosure is as follows. The food material is put into the cup 2 and the cup cover 13 is screwed tightly, then placed on the base 1. The induction switch 6 is pressed to start the circuit. The motor shaft of the brush motor drives horizontally mounted rotates the worm 20 and the worm 20 drives the worm wheel 21 to rotate. The worm wheel shaft drives the lower connector 10 and the upper connector 19 to rotate to drive the paddle cutter 18 to rotate, thereby realizing the function of extracting juice. During the operation of the machine, the cup 2 and the base 1 are tightly combined by the upper and lower magnets, and the LED indicators are illuminated in sequence to display the progress of the work in real time.

It is to be understood that the term "comprises", "comprising", or any other variants thereof, is intended to encompass a non-exclusive inclusion, such that a process, method, article, or device of a series of elements not only includes those elements but also includes other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclsoure. Accordingly, such modifications are considered within the scope of the disclosure as limited solely by the appended claims.

What is claimed is:

1. A detachable juicer, comprising:
   a base and a cup;
   wherein a bottom case is disposed on the bottom of the base; a driving device and a circuit board are mounted in the base; the driving device is connected to the circuit board; an inductive switch and a power line is connected with the circuit board; the inductive switch is mounted on the upper end surface of the base; a hole is provided in the center of the base;
   the driving device is connected with a lower connector, and the lower connector is located in the hole; a lower magnet is embedded in the upper end surface of the base, and an anti-slip suction cup is disposed; The anti-slip suction cup covers the lower magnet;

wherein the cup is provided with a cup cover, and the cup cover and the opening of the cup are connected by threads; the lower end surface of the cup cover is embedded with an upper magnet corresponding to the lower magnet; the middle part of the cup cover is provided with a tapered portion; the tapered portion is provided with a central through hole and is mounted with a paddle cutter; the shaft of the paddle cutter passes through the central through hole of the tapered portion, and the upper connector is connected to the bottom;

wherein the bottom of the upper connector and the top of the lower connector are engaged with each other.

2. The detachable juicer according to claim 1, wherein the driving device is a brushless motor mounted vertically, and the motor shaft is connected to the lower connector.

3. The detachable juicer according to claim 1, wherein the driving device is a brush motor horizontally mounted; the motor shaft is connected to a worm, and a worm wheel meshing with the worm is mounted on one side of the worm; the wheel shaft of the worm wheel is connected with the lower connector.

4. The detachable juicer according to claim 1, wherein the paddle cutter is provided with an upper V-shaped upper blade and an inverted V-shaped lower blade.

5. The detachable juicer according to claim 1, wherein the edge of the base is provided with an LED indicator, and the LED indicator is connected to the circuit board.

6. The detachable juicer according to claim 1, wherein the cup cover is provided with a sealing ring.

7. The detachable juicer according to claim 1, wherein the cup is made of plastic or glass.

\* \* \* \* \*